United States Patent
Nandy et al.

(10) Patent No.: US 10,678,797 B2
(45) Date of Patent: Jun. 9, 2020

(54) RANKING OF SHARED DOCUMENTS AND USERS

(71) Applicant: SAP SE, Walldorf (DE)

(72) Inventors: Tanushree Nandy, Bangalore (IN);
Pranav Acharya, Bangalore (IN);
Prasanna Bhat Mavinakuli, Bangalore (IN); Rahul Tiwari, Bangalore (IN);
Tejram Jagannath Sonwane, Bangalore (IN)

(73) Assignee: SAP SE, Walldorf (DE)

( * ) Notice: Subject to any disclaimer, the term of this patent is extended or adjusted under 35 U.S.C. 154(b) by 1305 days.

(21) Appl. No.: 14/827,366

(22) Filed: Aug. 17, 2015

(65) Prior Publication Data

US 2017/0052955 A1    Feb. 23, 2017

(51) Int. Cl.
*G06F 16/2457* (2019.01)
*G06F 16/93* (2019.01)
*G06F 16/9535* (2019.01)
*G06F 16/335* (2019.01)

(52) U.S. Cl.
CPC ...... *G06F 16/24578* (2019.01); *G06F 16/335* (2019.01); *G06F 16/93* (2019.01); *G06F 16/9535* (2019.01)

(58) Field of Classification Search
CPC .............................. G06F 16/9535; G06F 16/93
See application file for complete search history.

(56) References Cited

U.S. PATENT DOCUMENTS

| | | | |
|---|---|---|---|
| 2008/0059539 A1* | 3/2008 | Chin | G06Q 10/10 |
| 2011/0238696 A1* | 9/2011 | Zeller | G06F 21/6227 707/769 |
| 2013/0024948 A1* | 1/2013 | Chamarty | G06F 21/6209 726/28 |
| 2015/0242460 A1* | 8/2015 | Krishna | H04L 67/10 707/723 |
| 2016/0019298 A1* | 1/2016 | Brodie | G06F 16/9535 707/734 |

* cited by examiner

*Primary Examiner* — Charles E Lu
(74) *Attorney, Agent, or Firm* — Fish & Richardson P.C.

(57) ABSTRACT

Collaboration application includes a set of shared documents shared with users with different authorization rights. A request to provide relevant shared documents from the set of shared documents is received. Document ranks corresponding to the relevant shared documents are determined. The document ranks are determined based on weighted document factors related to the set of shared documents. A ranked list of the relevant shared documents is provided according to the determined document ranks. User rank for users in relation to a document from the relevant shared documents is determined. The user ranks are determined based on user factors and weights of the user factors. The user factors are related to authorization rights of the users to the document, sharing characteristics of the document and the users, and measurements over interactions of the users with documents from the set of shared documents that are shared with the users.

20 Claims, 6 Drawing Sheets

RANKING OF SHARED DOCUMENTS AND USERS

BACKGROUND

Enterprise data is generated mostly through different systems used within companies. Organizations can gain business value by exploring and navigating through the stored data. Business intelligence (BI) refers to a variety of software products that may be used to analyze raw data. Different BI techniques may be utilized to transform the raw data into meaningful and useful information that can server a number of business purposes, such as to improve decision-making. Self-service business intelligence (SSBI) is an approach to data analytics that enables business users to access and work with corporate information when collaborating.

When different parties collaborate over a particular topic, they usually work with a set of data or documents related to that topic. The different parties may be users or groups of user of different corporate systems and applications. Collaborating parties may have different roles in the collaboration process and may participate in more than one collaboration process. Collaboration tools are utilized in such work processes, where data and documents may be shared. The users work with the different applications and systems, which may be associated with the collaboration tools, and may utilize sharing capabilities of the collaboration tools. Thus, the users may share a common set of data or documents and may preview, modify, save, update, download, etc. relevant data and documents.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for ranking of shared documents and users are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Collaboration processes between users from different systems and applications may be associated with sharing of a set of data and/or documents through a collaboration application. The users may access the collaboration application and the set of data and/or documents may be previewed based on access rights and user roles. A document from a user's system, for example a BI application, may be exported to the collaboration application and a new object may be created. The new object may be shared through the collaboration application to other parties associated with a specific collaboration process. For example, other parties may be other users from different systems that are associated with the collaboration tool. For that newly created object, appropriate rights may be configured, which may include defined access rights as the object may be shared with users, exporting and working with documents from multiple systems connected to the collaboration application. The documents may be exported as information objects. When a user logs into the collaboration application, where shared objects are persisted, the underlying back-end system may define a list of the shared objects that are relevant for that particular user.

Figure 1A:
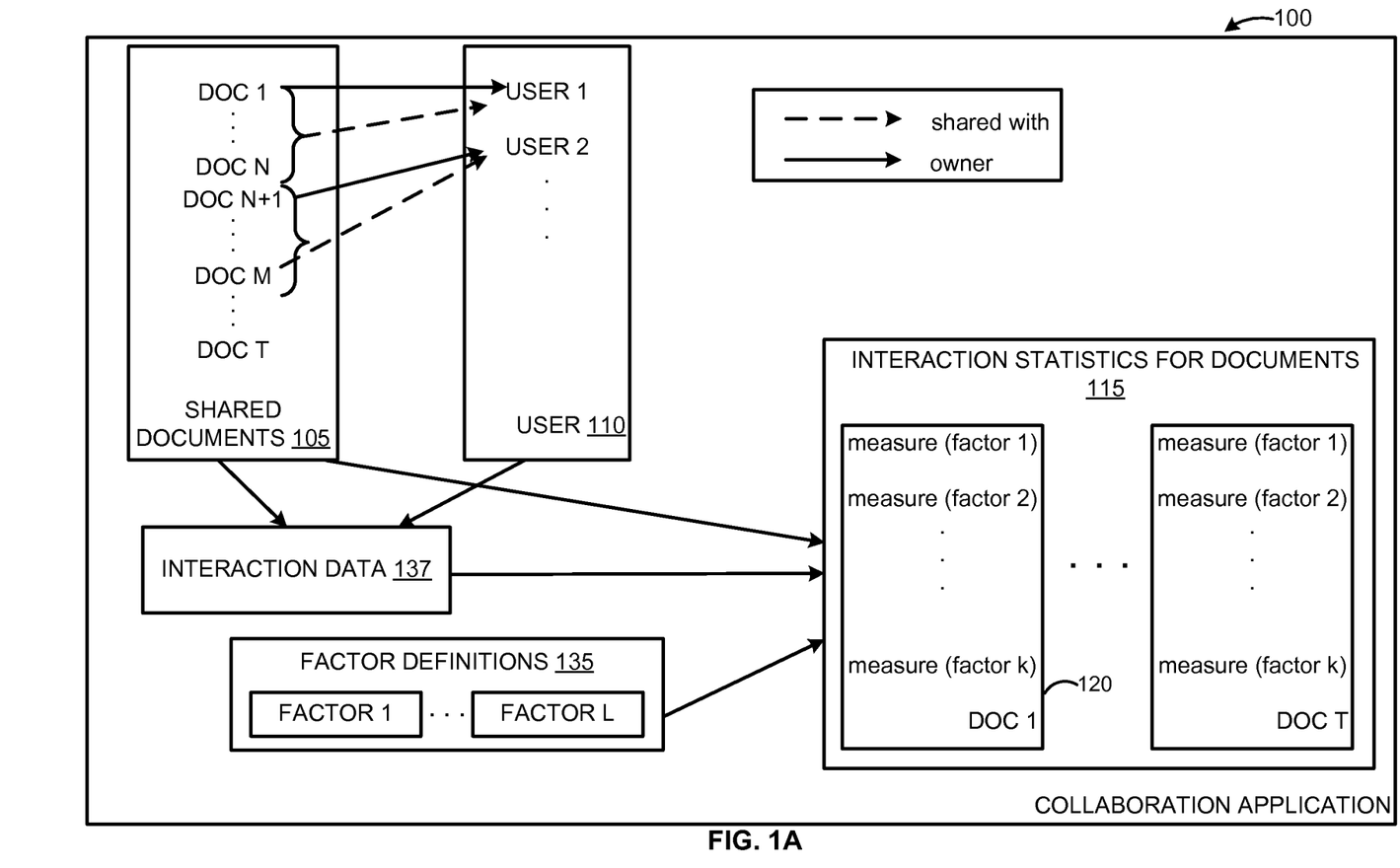
FIG. 1A is a block diagram illustrating an exemplary collaboration application for storing documents, information for users, and interaction statistics for the documents based on measuring interaction data associated with predefined factors, according to one embodiment.

FIG. 1A is a block diagram illustrating an exemplary collaboration application 100 for storing shared documents 105, information for users 110, and interaction statistics 115 for the documents based on measuring interaction data 137 associated with predefined factors, according to one embodiment. The shared documents 105 may be documents that are shared by different users from different systems through the collaboration application 100. The collaboration application 100 may persist the shared documents 105. Within the collaboration application 100, different users may be defined within the users 110 definition. For example, the shared documents 105 may be imported from one or more BI applications and stored as information objects in the collaboration application 100. For each document from the documents 105, access rights for the users 110 may be defined. The users 110 may be authorized or restricted to preview and/or edit one or more of the shared documents 105. The authorization rights associated with a user from the users 110 to a document from the shared documents 105 may be based on a particular role of the user in a collaboration process that is related to that particular document. In one embodiment, some part of the shared documents 105 may be owned by one of the users 110, and another part of the shared documents 105 may be shared with other users from the users 110. Document DOC 1, which is part of the shared documents 105, is owned by user 1, which is part of users 110. Documents DOC 1 through DOC N may be shared with user 1. Document DOC N+1 is owned by user 2, which is also part of defined users 110. Documents DOC N+1 through DOC M are shared with user 2.

In one embodiment, the users 110 interact with the shared documents 105 and data about interactions with the documents is collected and stored in interaction data 137. For example, the interaction data 137 may include data that defines when a document from the shared documents 105 is accessed, displayed, edited, saved, etc. by a particular user. Interaction statistics for each document from the shared documents 105 may be stored in interaction statistics for documents 115. Interaction statistics for documents 115 may be computed in relation to predefined factors for measurement that are defined in factor definition 135. The interaction statistics 115 may also be computed in association with a particular user and a particular document that the user may have access to.

In one embodiment, the factors as defined in the factor definitions 135, which may be document factors that are related to interactions with the shared documents 105 and document characteristics of a document from the shared documents. Further, interactions with the document may also be related to a factor definition. For example, a factor from the factors defined in the factor definitions 135 may be associated with a number of views of a particular document or a number of views of a particular document by a particular user. Therefore, measurements over the number of view may be performed. Other factors may be related to a number of times a document is shared with different users; a timestamp for the modifications—a first modification, a last modification, etc.; a number of editing, downloads, or other types of interactions with a document, etc. Another exemplary factor from the factors, defined in factor definitions 135, which is associated with document characteristics may be related to an ownership of a document by a particular user. Other examples of document characteristics may include a description of a type of the document, specifics of the data that is incorporated in the document, etc. Further examples of document factors related to both interactions with a document and document characteristics are described below.

In another embodiment, the factors as described in the factor definitions 135 may be divided into groups, based on defined criteria. One part of the factors 135 may be related to general characteristics of the documents and general interaction data for interactions with the documents by users from the users 110. Examples of such factors may, as described above, the number of views of a particular document, the number of times the document is shared, the timestamp of the last modification, etc. Another part of the factors 135 may be related to specific interactions and characteristics associated with a document, which are related to a particular user or a group of users from the users 110. Examples of such factors may be the number of views of a particular document by the particular user or group of users, ownership of the document by a particular user, etc.

The interaction statistics for documents 115 may include measurements related to the factors in the factor definitions 135 based on the stored interaction data 137 and the shared documents 105. At block 120, measurements related to factors from the factor definitions 135 for document DOC 1 may be provided. Such measurements may be computed for each of the shared documents 105. For each factor from the factors definition 135, measurements may be computed that represent factor values for that particular document based on computations and interpretations of data related to that DOC 1. The measurement of a factor value may evaluate interactions with the document based on collected data about the interactions with the shared documents 105, e.g. the interaction data 137. The measurement of the factor value may transform collected data about interactions related to the factor associated with the factor value based on a predefined formula for computation of the factor value.

Further, the interaction statistics for documents 115 may include statistics that are computed for a part of the factors 135 that is related to the general characteristics of the documents and general interaction data. For example, the part of the factors may be factor 1 through factor k, that are described in the factor definitions 135, which include a definitions of factor 1 through factor L, which include the set of factors from 1 to k. Additionally, the interaction statistics for documents 115 may further include user-related statistics that compute measures for that part of the factors in the factor definition 135 that are associated with specific interaction with a document by a particular user. The factor values for such factors may be values that are specific for the particular user.

Figure 1B:
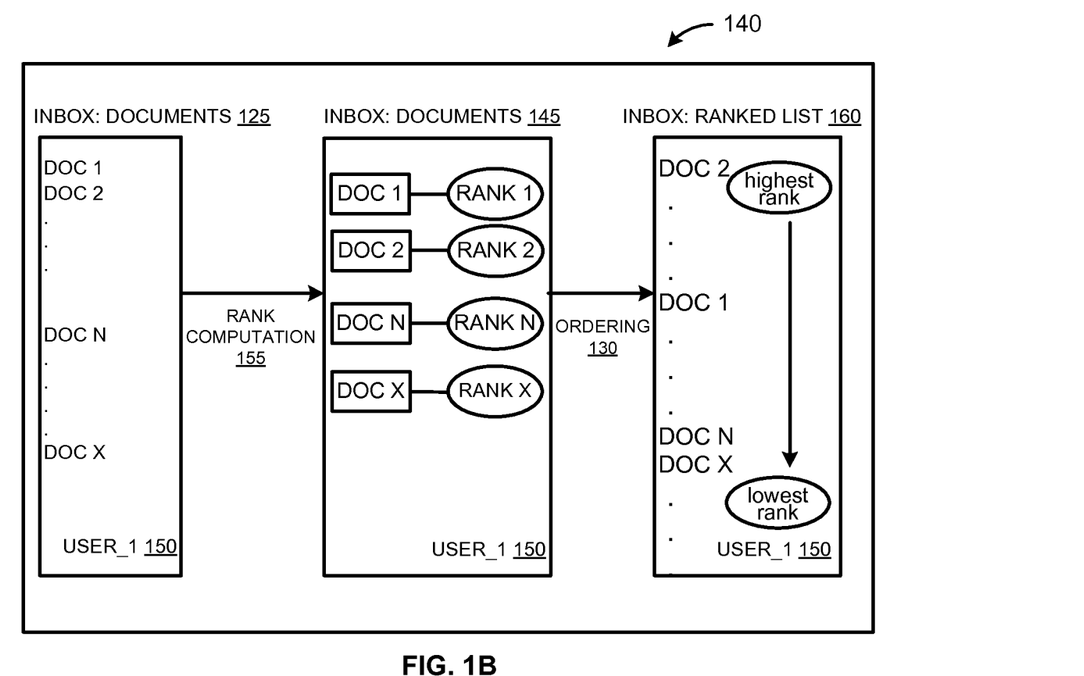
FIG. 1B is a block diagram illustrating a process for previewing shared documents in an ordered manner based on computed document ranks, according to one embodiment.

FIG. 1B is a block diagram illustrating a process 140 for previewing shared documents in an ordered manner based on computed document ranks, according to one embodiment. When a particular user "USER_1" 150 requests previewing of documents that are accessible for "USER_1" 150, then a list of documents 125 may be provided. For example, the list of documents 125 may be provided in an inbox for that particular user from a collaboration application. The list of documents 125 may include documents that are owned by "USER_1" 150 or shared with "USER_1" 150. The list of documents 125 are documents that are relevant for "USER_1" 150, as they are documents that "USER_1" 150 may collaboration with. If the user "USER_1" 150 requests previewing of the documents that are accessible for him in an ordered manner according to document ranks associated with the documents, a rank computation 155 may be accomplished. A document rank may define an importance and/or relevance of a document for the particular user, respectfully "USER_1" 150. Document ranks may be associated with document factors and corresponding priority weights. A priority weight and a factor value for a particular document factor with respect to a document may be used when computing a document rank. For example, a document that is modified sooner, and have a high number of views by "USER_1" 150 may be of higher relative importance to that user. Therefore, the document rank for that document may be higher, and the document may be provided and previewed to the user with priority. The rank computation 155 may include a process of determining document ranks for the list of documents 125 that are accessible by the "USER_1" 150. The document ranks may be associated with document factors related to the shared documents from the list of documents 125. The document factors may be such as the factors 135, FIG. 1A. A priority weight for each factor from these factors may be defined. The document factors may be associated with document interactions with the documents that are accessible by the user "USER_1" 150, and may also be associated with characteristics of the document.

In one embodiment, the document interactions may include general interactions with a document, performed by different users that have access to that document, and also user-specific interactions that are associated with the user "USER_1" 150. Interaction data about the document interactions may be used during the rank computation 155. The interaction data related to interactions with the shared document may be stored, for example by the collaboration application, such as the collaboration application 100. The interaction data may be such as the interaction data 137, FIG. 1A. After the rank computation 155, a list of the documents 145 corresponding to the list of documents 125 may be provided together with determined document ranks. Based on the computed document ranks, ordering 130 may be performed to generate a ranked list 160 of documents that provides the shared documents with the user "USER_1" 150 in an ordered manner. For example, from highest to lowest rank.

Figure 1C:
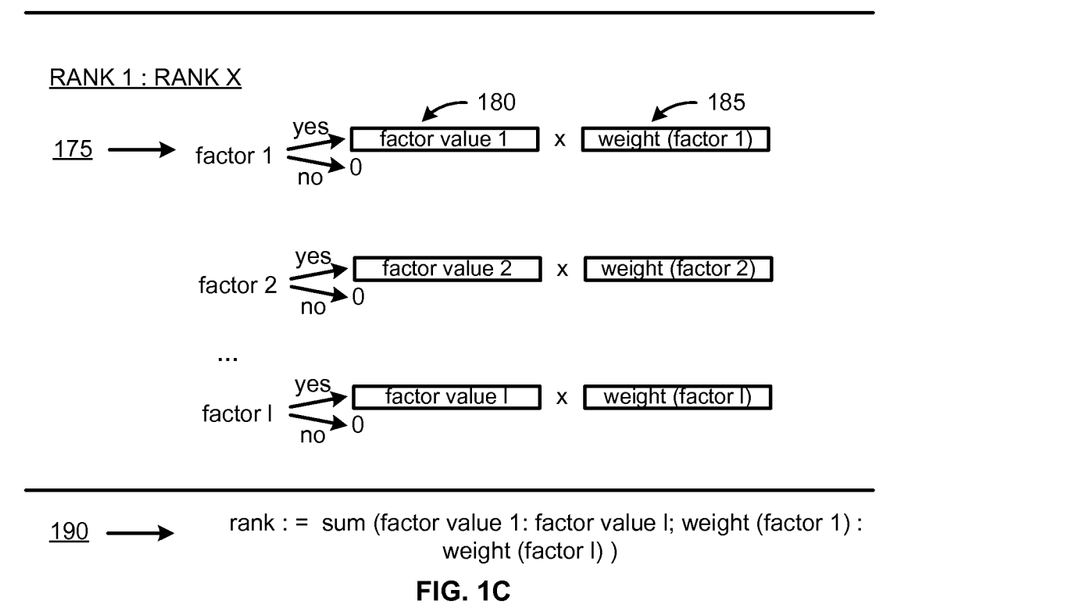
FIG. 1C is a block diagram illustrating an exemplary algorithm for computing document rank values for shared documents based on measured factors, according to one embodiment.

FIG. 1C is a block diagram illustrating an exemplary algorithm for computing document rank values for shared documents based on measured factors, according to one embodiment. For example, the share documents may be the shared documents 105, FIG. 1A, the shared documents 125, FIG. 1B, which are accessible by a user such as the user "USER_1" 150, FIG. 1B. The rank computation may be such as the rank computation 155, FIG. 1B. A computation of a document rank for a document from the shared documents may be performed. The computed document rank may be such as the provided document ranks associated with the list of documents 145, FIG. 1B. Such document rank may define relevant importance of a document for a user. Based on such relevant importance and defined document ranks, an ordered list of documents that are shared with a particular user may be provided. For example, the list may provide firstly the documents with a higher rank than those with a lower rank. In one embodiment, the computation of a document rank for DOC 1 may be performed through computing measures for document factors, such as the document factors discussed in relation to FIG. 1B, and the factor definitions 135, FIG. 1A.

In one embodiment, the document rank may be calculated based on defined document factors for the shared documents. The document rank may be based on weighted document factors associated with either document interaction and/or document characteristics. Computation of a rank value for a document may include computation of factor values for each of defined document factors—factor 1, factor 2, through factor k. Further, the document rank may also be computed based on a priority weight associated with each of the defined document factors.

The priority weight may be a predefined value particularly associated with a factor to define the relevant priority of the factor in determining the document rank as a whole. Therefore, a factor value for each factor may be determined and later the factor value may be weighted according to the defined priority weight for that factor. For example, computation 175 associated with factor 1 suggests measuring of a weighted factor value for factor 1. It is determined whether factor 1 is applicable for determining the document rank. For example, factor 1 may be defined as a timestamp of the last modification of the document. If the document is unmodified, then computation related to factor 1 and a calculation of a factor value 180 for factor 1 may not be performed and factor 1 may be omitted. However, if the document if modified, then a timestamp of that last modification may be used to determine the factor value 180. The factor value 180 may be defined as the number of days since the last modification, as defined in the timestamp, for example 5 days. When the factor value 180 is determined, it may be weighted to determine a weighted factor value, for example by weighting with a priority weight—weight (factor 1) 185. In such manner, a weighted factor value (multiplying the "factor value 1" 180 with "weight (factor 1)" 185) for factor 1 may be determined. Therefore, a document rank is computed through weighting factor values corresponding to the factors with the corresponding priority weights. Accordingly, weighted factor values for other factors, defined for determining the document rank may be computed. The document rank for the document may be calculated as suggested in formula 190—as a sum of factor values for all of the defined factors, weighted according to defined priority weights associated with each of the factors. The formula 190 suggests accumulating of the weighted factor values corresponding to all of the document factors defined for determining a document rank.

In one embodiment, Table 1 provides an exemplary program code that may be utilized to perform the operations suggested in the exemplary algorithm described in association with FIG. 1C. A variable TOTAL_FACTORS may be defined that determined the number of document factors that are defined for computing a document rank. A BF[ ] string is defined that includes boosting factors for each of the defined factors (when the factors are 14, then the elements in the string BF[ ] are 14), which represents priority weights as discussed in relation to weight 185. The defined priority weights in the BF[ ] may be numerical values that correspond to relevance of a document factor in determining of a corresponding document rank for a user.

TABLE 1

```
var TOTAL_FACTORS = 14;
//For every document, the rank will be calculated based on the factors
for that document as follows
var factorCount = 0;
var rank = 0;
for(factorCount=0; factorCount < TOTAL_FACTORS; factorCount++)
{
    rank += BF[factorCount] * (factor_value [factorCount] || 0);
}
```

The exemplary algorithm described in association with FIG. 1C and the exemplary program code from Table 1, may utilize factor definitions that define how a factor value for a document factor from the set of document factors may be calculated. Additionally, priority weights, such as the suggested string BF[ ] in Table 1. Table 2 includes the set of document factors that may be used when determining a document rank for a document when a request is received to provide a list of the relevant shared documents ordered according to a document rank. The set of document factors described in Table 2 are associated with corresponding priority weights assigned to each one of the factors. The priority weight may be a number value that corresponds to a relevant importance of a factor towards determining of a document rank. The priority weights may be stored in the string BF[ ], as suggested in Table 1.

TABLE 2

| Factor | Priority weight | Factor value calculation formula |
|---|---|---|
| Viewing a document by the requester (user related to the received request) | BF[0] = 2048; | Counting a number of views by the user requesting to provide a ranked list of relevant shared documents |
| Owning of a document | BF[1] = 1024; | If the document is owned by the user requesting to provide a ranked list of relevant shared documents, then the factor value equals a sum of a number of discussions, views, and shares of the document |
| Discussions of a document | BF[2] = 512; | Counting a number of discussions on the document |
| Viewing a document | BF[3] = 256; | Counting a number of views of the document |
| Sharing a document | BF[4] = 128; | Counting a number of times the document is shared |
| Last modification (time stamp) of a document | BF[5] = 64; | Determining a number of days since a day of last modification of the document as defined in a timestamp of the last modification |
| Editing of a document | BF[6] = 32; | Counting a number of times of the document is edited |
| Downloading of a document | BF[7] = 16; | Counting a number of times the document is downloaded |
| Data comprised in the document | BF[8] = 8; | Counting a number of visualizations in the document and a number of datasets comprised in the document |
| Data source of the document | BF[9] = 4; | For each specific data source a corresponding factor value may be determined. For example, for a data source which is an online data source, the factor value is computed to 2. |
| Online document | BF[10] = 2; | A Boolean value determining whether the document is an online document (a document that is connected to a data source) |
| Offline document | BF[11] = 1; | A Boolean value determining whether the document is an offline document (a document that incorporated a copy of data from a data source) |
| Geo hierarchies | BF[12] = 2; | A Boolean value that determines whether the document comprises some geographical hierarchy data |
| Last refresh of a document | BF[13] = 1; | Determining a number of days since a day of a last refresh of the document as defined in a timestamp of the last refresh |

Figure 2:
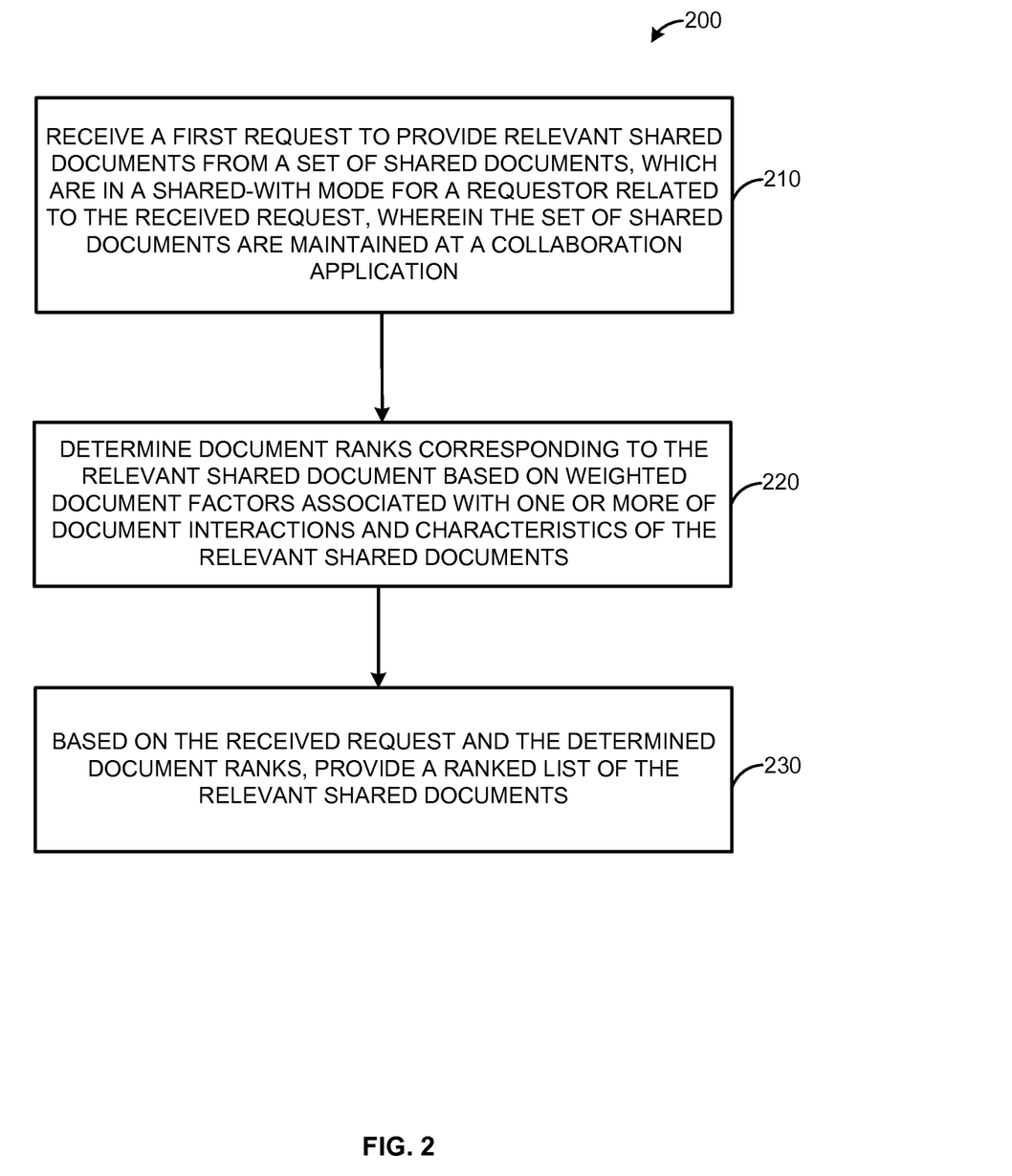
FIG. 2 is a flow diagram illustrating a process for ranking relevant shared documents based on determined document ranks, according to one embodiment.

FIG. 2 is a flow diagram illustrating a process 200 for ranking relevant shared documents based on determined document ranks, according to one embodiment. At 210, a request is received to provide relevant shared documents from a set of shared documents that are in a shared-with mode for a requestor associated with the received request. For example, the requestor may be a user that has authorization rights to one or more of the shared documents that are provided, for example, from a collaboration application, such as the collaboration application 100, FIG. 1A. Therefore, the user may request to preview those relevant shared documents that are in a shared-with mode. In one embodiment, the shared documents that are in a shared-with mode for the particular request may include documents that are owned by a user providing the request and/or may be documents that are shared by other users in the collaboration application with that user (requesting the preview).

At 220, document ranks are determined to correspond to the relevant shared documents that are requested at 210. The document ranks are determined based on weighted document factors associated with document interactions and characteristics of the relevant shared documents. The determination of the document ranks may be associated with a plurality of document factors and may also be related to priority weights, assigned to a document factor from the plurality of document factors. In one embodiment, the received request at 210 may provide information for identification of a requestor and/or a user that may be used when determining the document ranks. The document factors may be such as the factors described in relation to the factors defined in factor definitions 135, FIG. 1A and the exemplary factors described in Table 2. These document factors may be related to the set of shared document as a whole, to a particular one of those set of shared documents, or to a subset of the set of shared documents that are connected to the received request. The document factors may be associated with interactions with the relevant shared documents and characteristics of a document of the relevant shared documents. In one embodiment, users working with the collaboration application may perform the interactions with the relevant shared documents. Data about document interactions with the relevant shared document may be collected. The collected data may be part of general interaction data collected in relation to interactions with the set of shared documents from the collaboration application. The document interactions with the set of shared documents are interactions from users that are authorized to access one or more shared documents from the set of shared documents. The interactions may be performed by one or more users authorized to view, edit, save, delete, modify, download, etc. one or more of the set of shared documents. Additionally, a document factor from the document factors may also be associated with characteristics of a document as an object and to document's content. Examples of factors and factor definitions may be such as the examples provided in relation to FIG. 1A, FIG. 1B and FIG. 1C, and other presented examples.

In one embodiment, when determining the document ranks at 220, a factor value for a factor from the factors, which are related to the determination of the document ranks, may be calculated. When determining a factor value, a formula for the specific factor may be applied. The formula may be related to a type of a factor. For example, a factor may be related to particular interactions with a document and the factor value for that factor may measure the interactions with the given document based on collected data about the interactions, such as the interaction data 137, FIG. 1A. In another example, a factor value may quantify a characteristic of a document. If a factor is related to a type of a document, then the factor value for a first type of the document may be for example 1, and for a second type may be of value 2, etc. Other examples of determining a factor value for a factor may further be provided. In some embodiments, the factor value for a given factor is a value that interprets measurements of interactions with one or more document, which interactions may be related to the given factor. The interpretations of the measurements may be based on specific criteria for transformation of the measurements. For example, if a specific criterion is met, such as that a document is owned by a user requesting the computation of document ranks for the documents that are accessible by him, then a factor value for a factor related to interactions with the document, may be determined as a sum of a number of views of the document, a number of discussions over the document, a number of shares of the document, and/or other type of interactions (e.g. downloading, editing).

The document ranks may be computed through summing weighting factor values determined for the defined factors when determining a document rank. The weighted factor values may be computed through weighting the determined factor values with predefined priority weights. For example, the computation of the document ranks may be such as the suggested algorithm at FIG. 1C. The weighting of the factor value may be performed through multiplying the calculated factor value with a corresponding priority weight. The priority weights for the factor values may be predefined numbers that correspond to the relevance of a particular factor in determining the importance of a document. The importance of the document may be defined as importance of providing the document to a user in the collaboration application. The documents according to their importance, and respectfully according to the determined document ranks may be provided to the user in a ranked list.

At 230, based on the received request to provide the relevant shared documents and the determined document ranks, a ranked list of the relevant shared documents may be provided. First, based on the provided requests, a list of relevant shared documents may be determined. According to the determined document ranks for the relevant shared documents requested at 210, and also according to the received requests for providing the relevant shared document, the list of relevant shared documents may be ordered and the ranked list of the relevant shared documents may be generated.

Figure 3:
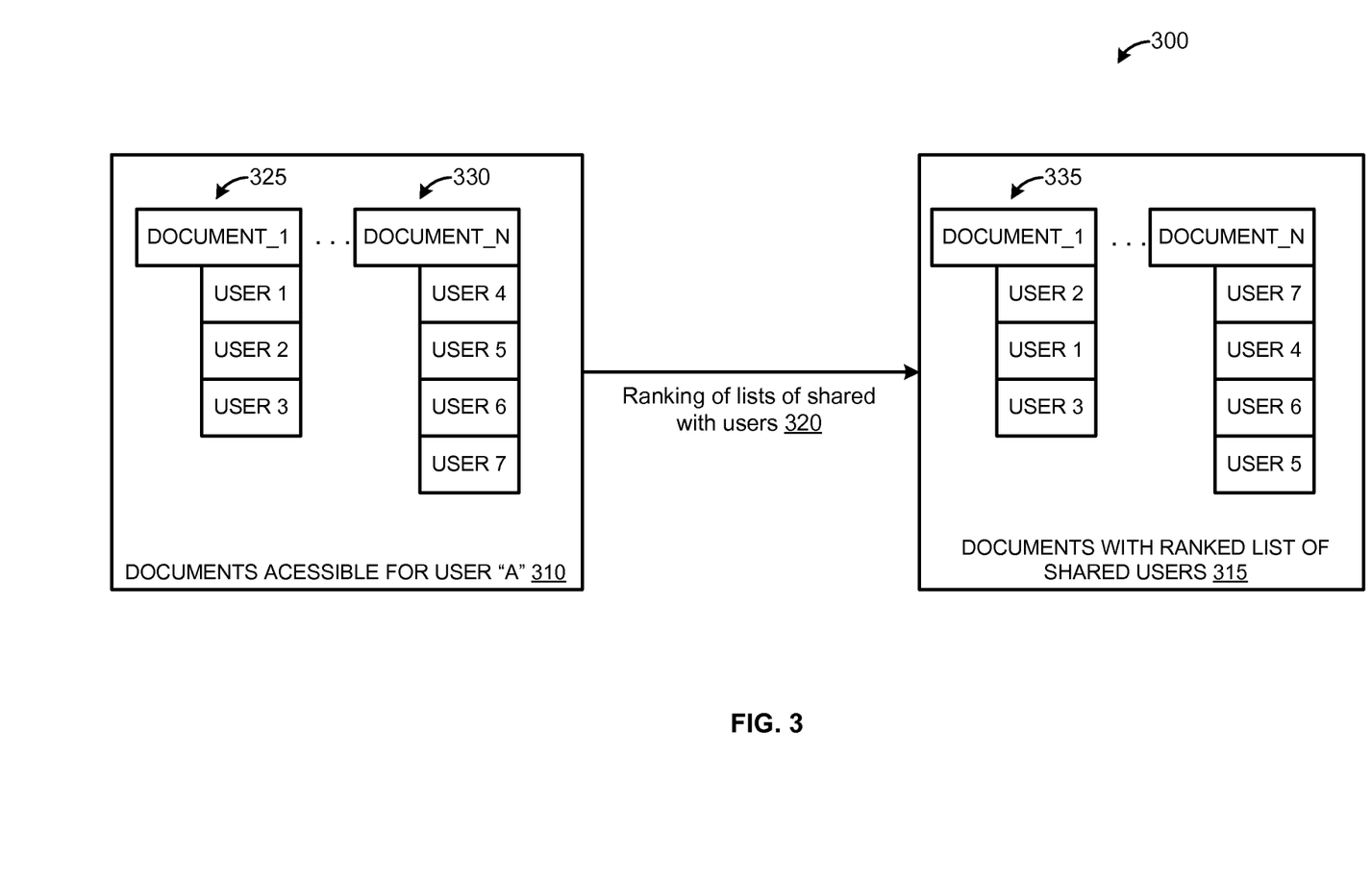
FIG. 3 is a block diagram illustrating an exemplary process for providing shared documents with an associated ranked list of shared users based on determined user ranks, according to one embodiment.

FIG. 3 is a block diagram illustrating an exemplary process 300 for providing shared documents with an associated ranked list of shared users based on determined user ranks, according to one embodiment. In one embodiment user "A" of a collaboration application, such as the collaboration application 100, FIG. 1A is authorized to preview a set of shared documents—documents accessible for user "A" 310, that are persisted, for example, by a collaboration application. These documents 310 may be shared with user "A" or may be documents that are owned by user "A". The documents 310 comprise document_1 325 through document_N 330. The documents 310 are configured to be accessible by user "A", based on defined authorization rights. The documents 310 may be provided to user "A" as a ranked list based on determined document ranks, as described in process 140, FIG. 1B, and in process 200, FIG. 2. Document_1 325 is a document that is accessible by user "A", for example user "A" may view and edit document_1 325. Document_1 325 is in a shared-with mode with a number of users, defined in the collaboration application. The users that have access to document_1 325, apart from user "A", are user 1, user 2, and user 3. Document_N 330 is a document accessible for user "A" that is in a shared-with mode with user "A", user 4, user, 5, user 6, and user 7. User "A" may request from the collaboration application to provide the relevant shared documents together with a list of users for each of the relevant shared documents.

A list of users includes users that are in a shared-with user terms to a document from the relevant shared documents. The list of shared-with users for a document may be provided to a user in a different manner, for example in an alphabetical order. Further, the ordering of shared-with users in the list may be according to determined user ranks that positions users that are more relevant to the document at the beginning of the list. The providing of a ranked of shared-with user in a relevant manner may be useful for a user in determining those of the users that are active in the collaboration process and worked on the document at a closer point in time.

In one embodiment, at 320, the shared-with user lists associated with corresponding documents from the documents accessible for user "A" 310 are ranked according to determined user ranked. The user ranks for users in a shared-with mode for a document may be determined based on user factors related to authorization rights defined for the document, sharing characteristics of the document and the users, and measurements over interactions of the users with one or more documents from the set of shared document that are provided by the collaboration application. Documents with ranked lists of shared users 315 may be provided that comprises the documents accessible for user "A" 310—document_1 325 through document_N 330. Document_1 335 corresponds to document_1 325 and document_N 240 corresponds to document_N 330. Document_1 335 and document_N are provided with a ranked list of users. The users that are in a shared-with mode with document_1 335 are user 1, user 2, and user 3, and they are ordered in the following manner—user 2, user 1, and user 3, according to determined user ranks for the users. The user rank of user 2 is higher compared to the user rank of user 1 and user rank of user 3. Therefore, user 2 is provided at a first place in the ranked list of shared users for document_1 335.

The determination of a user rank for a user that is in a shared-with mode with a document may follow a ranking algorithm that calculates the user rank based on computations over different user-specific factors and weighting the factors according to user factor weights, which may be predefined in the collaboration application. In one embodiment, a factor related to determining of the user rank of a user in relation to a document may be associated with interactions of the user with the document and with other documents from the set of shared documents provided by collaboration application. For example, such user factors may be related to a timestamp of a last modification of a document by the particular user, a number of documents that are accessed by the particular user. Further factors related to the determination of the user rank may be related to authorization rights of the particular user in relation to that document, e.g. the user may have only access rights to the document (e.g. viewing capabilities) or may further have rights to modify the document (editing capabilities). More, factors may be related to sharing characteristics of the particular user. For example, a factor may be related to a number of common documents that are in a shared-with mode for both the user, for whom a user rank is determined, and the user that accesses the document; a number of common groups; a timestamp of a last login in the collaboration application by the user; an average time spent by the user in the collaboration application per user session; a number of documents from the set of shared document in the collaboration application that are unshared with that user; etc. Also, factors may be related to sharing characteristics defined for the document, e.g. document_1 335—for example, a license type of the document—is it concurrent document, or a document shared by a named user, etc.

Figure 4:
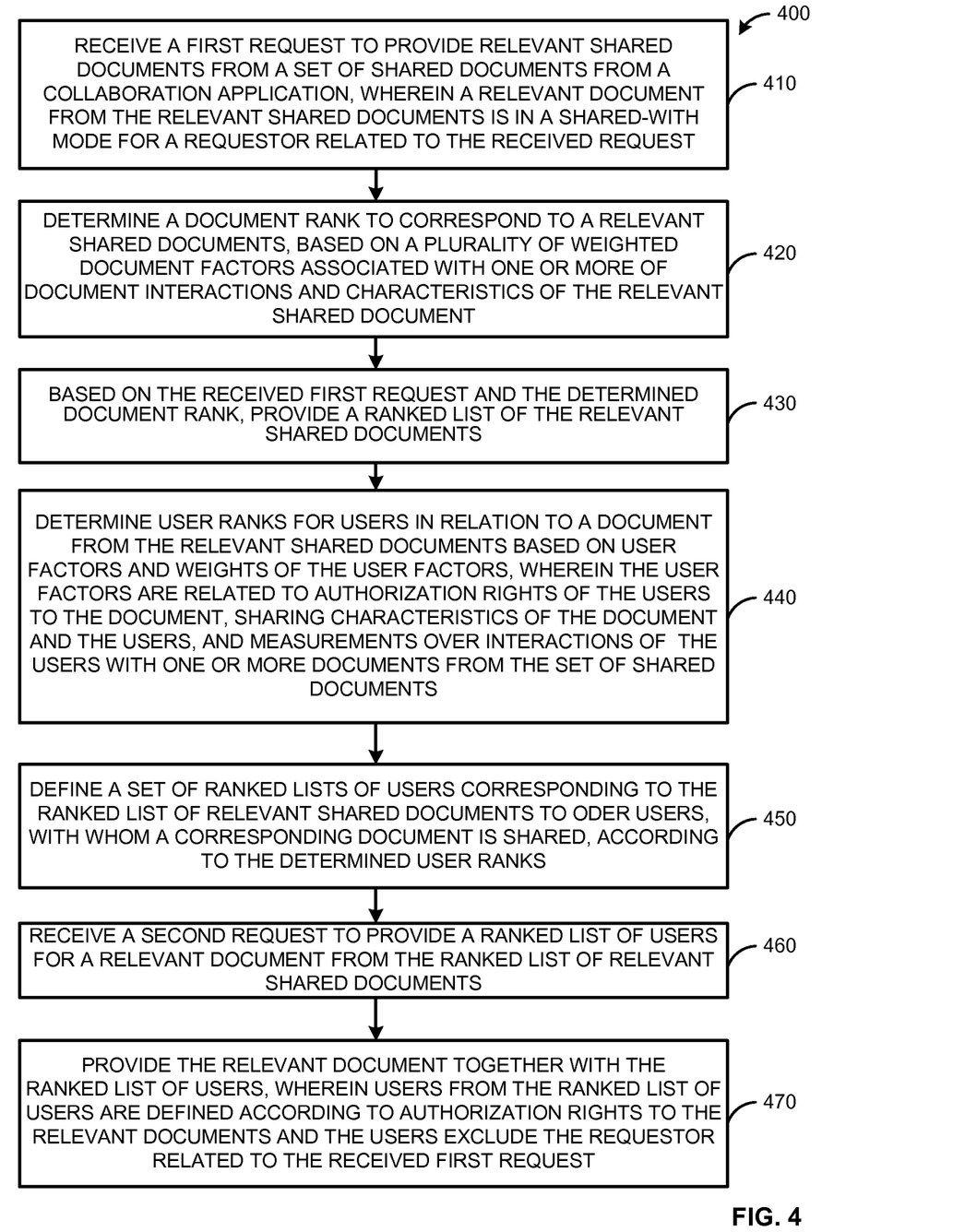
FIG. 4 is a flow diagram illustrating a process for providing relevant shared documents from a set of shared documents as an ordered list based on determined document ranks, and providing a ranked list of users for a document from the relevant shared documents, according to one embodiment.

FIG. 4 is a flow diagram illustrating a process 400 for providing relevant shared documents from a set of shared documents as an ordered list based on determined document ranks, and providing a ranked list of users for a document from the relevant shared documents, according to one embodiment. At 410, a first request is received to provide relevant shared documents from a set of shared documents from a collaboration application, such as the collaboration application 100, FIG. 1A. The request may define a preference for ordering the relevant shared documents, when the documents are provided through the collaboration application. The relevant shared documents for the request are those one or more shared documents that are in a shared-with mode for a requestor related to the received request. For example, if the request is provided by a user, the relevant shared documents may be the shared documents from the set of shared document that are owned by the user and also further shared documents that are shared with the user, for example by other users in the collaboration application. In one embodiment, the relevant shared documents may be documents related to collaboration processes, which involve interactions between the user and other user through the relevant shared documents. The request may define that the relevant shared documents are to be provided in an ordered manner according to document ranks. Document ranks may be defined in the collaboration application and may be associated with predefined document factors and priority weights of the document factors.

At 420, a document rank for a relevant shared document is determined. The document rank is associated with one or more document factors related to the set of shared documents and a priority weight of a factor from the one or more factors. An algorithm for computing a document rank for a document in response to a received request, which may be sent by a user working with the collaboration application, may be the algorithm presented in relation to FIGS. 1A, 1B, and 1C. At 430, based on the received first request at 410, a ranked list of the relevant shared documents is provided. Providing the ranked list of the relevant shared document may include determining the relevant shared documents and then ordering the determined relevant shared documents according to determined document ranks for each of the documents from the list of relevant shared documents.

At 440, use ranks for users, in relation to a document from the relevant shared document, is determined. The user rank is determined based on user factors and weights of the user factor. The user factors are related to authorization rights of the users to the document, sharing characteristics of the document and the users, and measurements over interactions of the users with one or more user documents from the set of shared documents that are shared with the user. The user factor weights may be values that correspond to importance of a user factor in determining a user rank. At 450, a set of ranked lists of user corresponding to the ranked list of relevant shared documents is determined. The set of ranked lists of users order users, with whom a corresponding document is shared, according to the determined document user ranks.

At 460, a second request is received to provide a ranked list of users for a relevant document from the ranked list of the relevant shared documents (provided at 430). At 470, the relevant document together with the ranked list of user is provided. Users from the ranked list of users are defined according to authorization rights to the relevant document and the users exclude the requestor related to the received first request. The ranked list of user included users that are in a shared-with mode with the relevant document, apart from the requestor related to the received request at 410 for providing the relevant shared documents.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
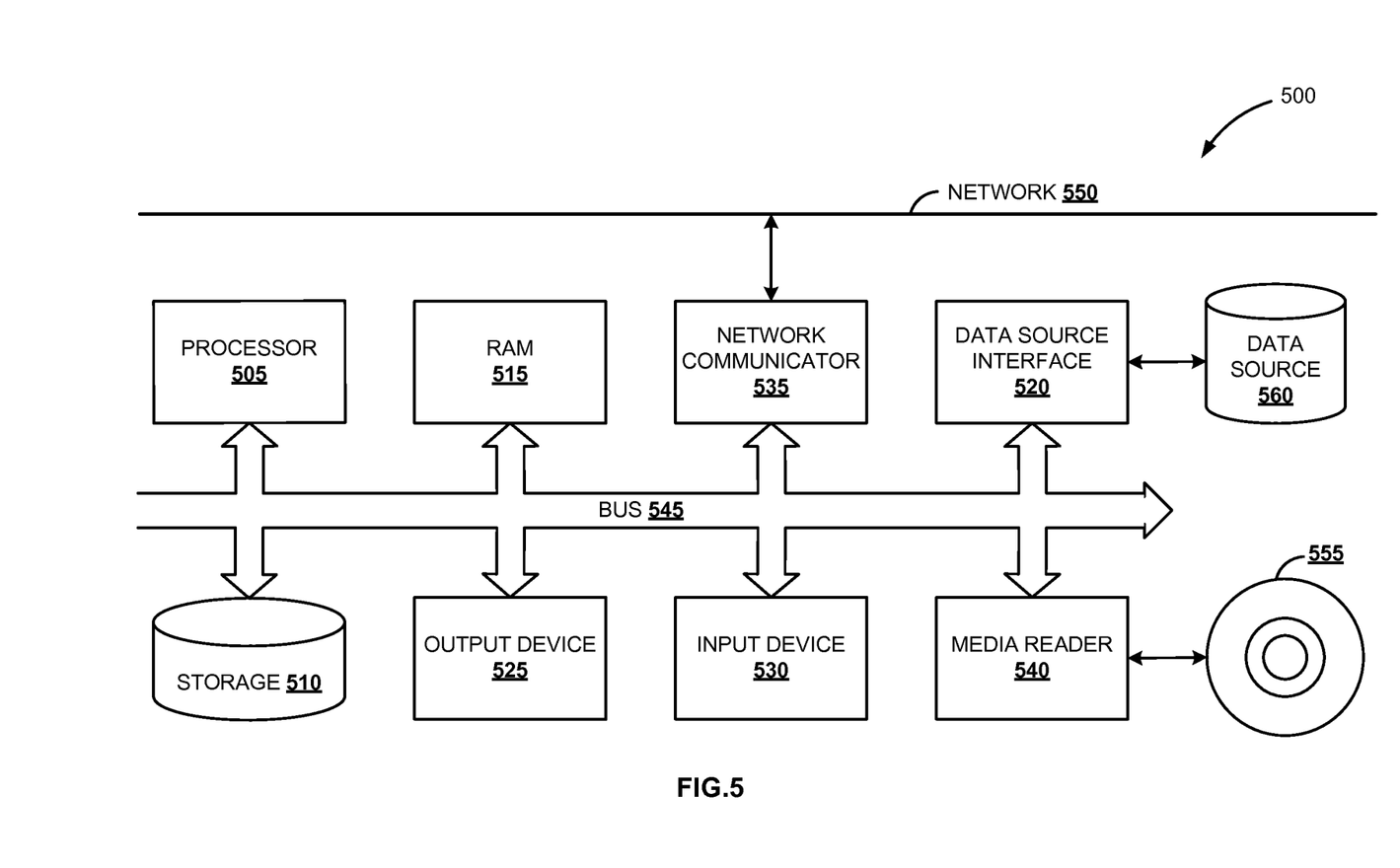
FIG. 5 is a block diagram illustrating an embodiment of a computing environment in which the techniques described for ranking shared documents and users can be implemented.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system X00 includes a media reader 540 to read the instructions from the computer readable storage medium 555 and store the instructions in storage 510 or in random access memory (RAM) 515. The storage X10 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to rank shared documents, the system comprising:
    a processor;
    a memory in association with the processor storing instructions which when executed by the processor cause the computer system to:
        receive a first request to provide relevant documents from a set of shared documents accessible by corresponding one or more users from a plurality of users of a collaboration application, wherein the relevant documents are accessible by a first user related to the received first request, and wherein the set of shared documents are maintained and shared with the corresponding one or more users through the collaboration application based on access rights associating a user from the plurality of users with one or more documents from the set of shared documents;
        determine document rank values corresponding to the relevant documents for the first user, wherein a document rank value is computed based on weighting a plurality of values for a plurality of document factors associated with the document according to a plurality of weight values defined correspondingly for the plurality of document factors, wherein a document factor from the plurality of document factors is associated with a weight value from the plurality of weight values defining a priority weight of the document factor in relation to other document factors from the plurality of document factors, wherein a first set of factor values from the plurality of values are computed for a corresponding first set of the document factors from the plurality of document factors based on interaction statistics computed for the document in relation to the first user, and wherein a second set of factor values from the plurality of values are computed for a corresponding second set of document factors from the plurality of document factors in relation to document characteristics, wherein the document rank value is determined according to the first set of factor values, the second set of factor values, and the plurality of weight values corresponding to the plurality of document factors; and provide a ranked list of the relevant documents, based on the received first request and ordering the determined document rank values for the relevant documents for the first user.

2. The system of claim 1,
wherein the set of shared documents is imported from a business intelligence application as information objects, and the ranked list of the relevant documents is provided through the collaboration application,
wherein the second set of document factors are related to the document characteristics of the set of shared documents, the document characteristics comprise ownership identification data, a type of document, and a data type of document content, and
wherein a factor from the plurality of document factors is part of the first set of document factors and the second set of document factors as related to interactions with the document and document characteristics.

3. The system of claim 1, further comprising instructions to:
determine user ranks for users in relation to a document from the relevant documents for the first user based on user factors and weights of the user factors, wherein the user factors are related to authorization rights of the users to the document, sharing characteristics of the document and the users, and measurements over interactions of the users with one or more documents from the set of shared documents, and wherein the document is accessible by the users determined from the plurality of users of the collaboration application.

4. The system of claim 3, further comprising instructions to:
receive a second request to provide a ranked list of users for the document from the relevant documents; and
determine the ranked list of users for the document based on ordering the users according to the determined user ranks.

5. The system of claim 3, further comprising instructions to:
collect data about interactions with the set of shared documents to compute interaction statistics for a document from the set in relation to a user from the plurality of users, wherein the document interactions with the set of shared documents are interactions from one or more users authorized to one or more of the set of shared documents.

6. The system of claim 5, wherein the collected data about the document interactions is related to user interactions associated with owning, viewing, editing, and sharing the set of shared document.

7. A computer implemented method to rank shared documents, the method comprising:
receiving a first request to provide relevant documents from a set of shared documents accessible by corresponding one or more users from a plurality of users of a collaboration application, wherein the relevant documents are accessible by a first user related to the received first request, and wherein the set of shared documents are maintained and shared with the corresponding one or more users through the collaboration application based on access rights associating a user from the plurality of users with one or more documents from the set of shared documents;
determining document rank values corresponding to the relevant documents for the first user, wherein a document rank value is computed based on weighting a plurality of values for a plurality of document factors associated with the document according to a plurality of weight values defined correspondingly for the plurality of document factors, wherein a document factor from the plurality of document factors is associated with a weight value from the plurality of weight values defining a priority weight of the document factor in relation to other document factors from the plurality of document factors, wherein a first set of factor values from the plurality of values are computed for a corresponding first set of the document factors from the plurality of document factors based on interaction statistics computed for the document in relation to the first user, and wherein a second set of factor values from the plurality of values are computed for a corresponding second set of document factors from the plurality of document factors in relation to document characteristics, wherein the document rank value is determined according to the first set of factor values, the second set of factor values, and the plurality of weight values corresponding to the plurality of document factors; and
providing a ranked list of the relevant documents, based on the received first request and ordering the determined document rank values for the relevant documents for the first user.

8. The method of claim 7, wherein the set of shared documents is imported from a business intelligence application to the collaboration application as information objects, and the ranked list of the relevant documents is provided through the collaboration application.

9. The method of claim 7, further comprising:
determine user ranks for users in relation to a document from the relevant documents for the first user based on user factors and weights of the user factors, wherein the user factors are related to authorization rights of the users to the document, sharing characteristics of the document and the users, and measurements over interactions of the users with one or more documents from the set of shared documents, and wherein the document is accessible by the users determined from the plurality of users of the collaboration application; and
providing a relevant document from the ranked list of the relevant documents together with a document ranked list of users from the ranked lists of users, wherein users from the document ranked list of users are defined according to authorization rights to the relevant documents and the users exclude the first user related to the received first request.

10. The method of claim 7, further comprising:
collecting data about interactions with the set of shared documents to compute interaction statistics for a document from the set in relation to a user from the plurality of users, wherein the document interactions with the set of shared documents are interactions from one or more users authorized to one or more of the set of shared documents.

11. The method of claim 10, wherein the collected data about the document interactions is related to user interactions associated with owning, viewing, editing, and sharing the set of shared document.

12. The method of claim 11, wherein the document interactions with the set of shared documents are interactions from one or more users authorized for one or more shared documents from the set of shared documents.

13. The method of claim 8, further comprising:
receive a second request to provide a ranked list of users for the document from the relevant documents; and
determine the ranked list of users for the document based on ordering the users according to the determined user ranks.

14. The method of claim 7, wherein the document characteristics comprise ownership of the document, type of the document, and type of data incorporated in the document.

15. A non-transitory computer-readable medium storing instructions to rank shared documents, which when executed cause a computer system to:
receive a first request to provide relevant documents from a set of shared documents accessible by corresponding one or more users from a plurality of users of a collaboration application, wherein the relevant documents are accessible by a first user related to the received first request, and wherein the set of shared documents are maintained and shared with the corresponding one or more users through the collaboration application based on access rights associating a user from the plurality of users with one or more documents from the set of shared documents;
determine document rank values corresponding to the relevant documents for the first user, wherein a document rank value is computed based on weighting a plurality of values for a plurality of document factors associated with the document according to a plurality of weight values defined correspondingly for the plurality of document factors, wherein a document factor from the plurality of document factors is associated with a weight value from the plurality of weight values defining a priority weight of the document factor in relation to other document factors from the plurality of document factors, wherein a first set of factor values from the plurality of values are computed for a corresponding first set of the document factors from the plurality of document factors based on interaction statistics computed for the document in relation to the first user, and wherein a second set of factor values from the plurality of values are computed for a corresponding second set of document factors from the plurality of document factors in relation to document characteristics, wherein the document rank value is determined according to the first set of factor values, the second set of factor values, and the plurality of weight values corresponding to the plurality of document factors; and
provide a ranked list of the relevant documents, based on the received first request and ordering the determined document rank values for the relevant documents for the first user.

16. The computer readable medium of claim 15, wherein the set of shared documents is imported from a business intelligence application as information objects in the collaboration application, and the ranked list of the relevant documents is provided through the collaboration application.

17. The computer readable medium of claim 15, further comprises instructions, which when executed by a computer, cause the computer to:
collect data about interactions with the set of shared documents to compute interaction statistics for a document from the set in relation to a user from the plurality of users, wherein the document interactions with the set of shared documents are interactions from one or more users authorized to one or more of the set of shared documents.

18. The computer readable medium of claim 17, wherein the collected data about the interactions is related to user interactions associated with owning, viewing, editing, and sharing the set of shared document.

19. The computer readable medium of claim 18, wherein the document interactions with the relevant documents are from one or more users authorized for one or more shared documents from the set of shared documents.

20. The computer-readable medium of claim 15, further comprising instructions, which when executed by the computer system, cause the computer system to:
receive a second request to provide a ranked list of users of a document from the provided ranked list of the relevant shared documents; and
determine and provide the ranked list of users for the document ordered according to user ranks of the users, wherein a user rank for a user is determined based on weighted user factors related to authorization rights of the user to the document, sharing characteristics of the document and the user, and measurements over interactions of the user with one or more documents from the set of shared documents.

* * * * *